(12) United States Patent
Loughrey

(10) Patent No.: US 6,960,892 B2
(45) Date of Patent: Nov. 1, 2005

(54) VARIABLE OUTPUT SINGLE CONSTANT SOURCE LIGHT FIXTURE

(76) Inventor: James F. Loughrey, 4576 Echo La., Stacy, MN (US) 55079

( * ) Notice: Subject to any disclaimer, the term of this patent is extended or adjusted under 35 U.S.C. 154(b) by 0 days.

(21) Appl. No.: 09/726,394

(22) Filed: Dec. 1, 2000

(65) Prior Publication Data

US 2002/0105285 A1 Aug. 8, 2002

(51) Int. Cl.[7] ............................. G05F 1/00; H05B 37/02
(52) U.S. Cl. ........................ 315/294; 315/312; 315/324
(58) Field of Search .................. 315/224, 291–296, 315/312, 314, 316, 318, 320, 324, 362

(56) References Cited

U.S. PATENT DOCUMENTS

| | | | |
|---|---|---|---|
| 4,388,567 A | * | 6/1983 | Yamazaki et al. .......... 315/294 |
| 5,530,322 A | * | 6/1996 | Ference et al. ............. 315/294 |
| 6,031,343 A | * | 2/2000 | Recknagel et al. ......... 315/292 |
| 6,188,181 B1 | * | 2/2001 | Sinha et al. ................ 315/293 |
| 6,208,319 B1 | * | 3/2001 | Nishida ..................... 345/1.3 |
| 6,333,602 B1 | * | 12/2001 | Kayser ....................... 315/292 |
| 6,400,103 B1 | * | 6/2002 | Adamson .................... 315/294 |
| 6,528,954 B1 | * | 3/2003 | Lys et al. ................... 315/291 |

OTHER PUBLICATIONS

The Random House College Dictionary, p. 499.*

* cited by examiner

Primary Examiner—Wilson Lee
(74) Attorney, Agent, or Firm—Lowe Hauptman & Berner LLP.

(57) ABSTRACT

A light fixture having a variable light output level using one constant voltage power source includes multiple individually computer controllable light sources. Multiple light fixtures may be networked and individually controlled. Additional accessory control devices, such as motion sensors, photo sensors, and time clocks, may be connected with the light fixture and networked.

2 Claims, 8 Drawing Sheets

VARIABLE OUTPUT SINGLE CONSTANT SOURCE LIGHT FIXTURE

FIELD OF THE INVENTION

The present invention relates generally to a light fixture having variable light output levels, and more particularly, to such a light fixture having more than one light source. Still more particularly, the present invention relates to a light fixture wherein each light source within the fixture is individually controllable, and more particularly, to such a light fixture which is networkable.

BACKGROUND ART

The current state of the art of which I am aware for controlling the infinitely variable intensity of light within a space, (either ambient light or accent light, such as theatrical lighting) is to use a phase fired dimmer to chop the sign wave voltage and supply the fixture or lamp with a voltage varying from 0 volts to 120 volts. The single light source in the fixture is then controlled over the range from off to full bright. In operation, this is a dimmer control. By varying the voltage supplied to the light source; therefore, the light output level of the fixture is varied. There is a need in the art to control the light output level of a fixture by controlling individual light sources in the fixture without varying the voltage supplied to the fixture; more particularly, there is a need to control individual light sources of a constant voltage source light fixture.

The current technology to dim a fixture varies the voltage by using a phase fired silicon controlled rectifier (SCR) dimmer. The voltage is supplied to a single filament or light source and the light output level increases in intensity as the voltage and current rise. One particular drawback of these systems is electromagnetic interference (EMI) and radio frequency interference (RFI) generated by the SCR dimmer. EMI and RFI are generated by the SCR dimmer even when using a torroidal choke on the output of the dimmer. Therefore, there is a need in the art to eliminate the EMI and RFI generated by a light fixture, and more particularly, there is a need in the art to eliminate the EMI and RFI generated by varying the light output level of a light fixture.

New United States energy code requirements as of this writing will require all lighting output in public buildings to be controllable to at least two levels to meet the energy saving requirements of the energy code. Existing buildings not conforming to the code will require installation of new wires to fixtures and splitting the ballasts and light sources within the fixtures into two separate circuits. Thus, there is a need in the art to ease the retrofitting of existing fixtures to obtain at least two different levels of light output.

Typically, it is standard practice to provide two different power feeds to a fixture to obtain two levels of lighting. Providing two different power feeds to a fixture is more expensive and requires additional line voltage field wiring to remote switches in order to operate. Therefore, there is a need in the art to enable a fixture to obtain at least two levels of lighting using a single power feed. Further, additional wiring is required to remotely control additional fixtures and for controlling the two lighting levels. Therefore, there is a need in the art to network light fixture control.

DISCLOSURE OF THE INVENTION

Accordingly, an object of the present invention is to control the light output level of a fixture by controlling individual light sources in the fixture without varying the voltage supplied to the fixture.

Another object of the present invention is to eliminate the EMI and RFI generated by a light fixture.

Another object of the present invention is to eliminate the EMI and RFI generated by varying the light output level of a light fixture.

Another object of the present invention is to ease the retrofitting of existing fixtures to obtain at least two different levels of light output.

Another object of the present invention is to enable a light fixture to obtain at least two levels of light output using a single power feed.

Another object of the present invention is to network light fixtures.

The present invention is a light fixture having a variable light output level. The light fixture includes multiple individually controllable light sources. Multiple light fixtures may be networked.

With respect to the present invention, the term light source socket is used to mean any socket, connector, or other mechanism adapted to receive a source of lumination. The term light fixture is used to mean any lighting device having a light source socket and adapted to provide power to the light source socket for illuminating an area. The fixture produces luminance directed toward an area when a light source is inserted in the light source socket and power is provided to the light source via the socket. The fixture may have a plurality of light source sockets.

An apparatus aspect of the present invention includes a light fixture having a plurality of light source sockets and a light controller connected to the plurality of light source sockets for controlling individually each one of the plurality of light source sockets.

The light fixture light output level may be dimmed by individually turning on and off each one of the light source sockets. Advantageously, by dimming the light output level in this manner, no EMI and RFI are generated by the light fixture. Further, the light fixture uses a single power source to individually control and power each of the light source sockets. Uniquely, multiple levels of light output are obtainable without a need for separate wiring, therefore, easing retrofitting of existing fixtures.

In a further aspect, multiple light fixtures of the present invention may be networked to provide distributed remote control of the light fixtures. Advantageously, light fixtures and light source sockets are individually controllable using the network.

In a method aspect, a method of modifying the light output level of a light fixture having a plurality of light source sockets, light sources connected to the light source sockets and a light control connected to each of the plurality of light source sockets. The light control individually controls the plurality of light source sockets. The light fixture receives a signal to modify the light output level of the light fixture and individually activates or deactivates one or more of the plurality of light source sockets in response to the received signal.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWING

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
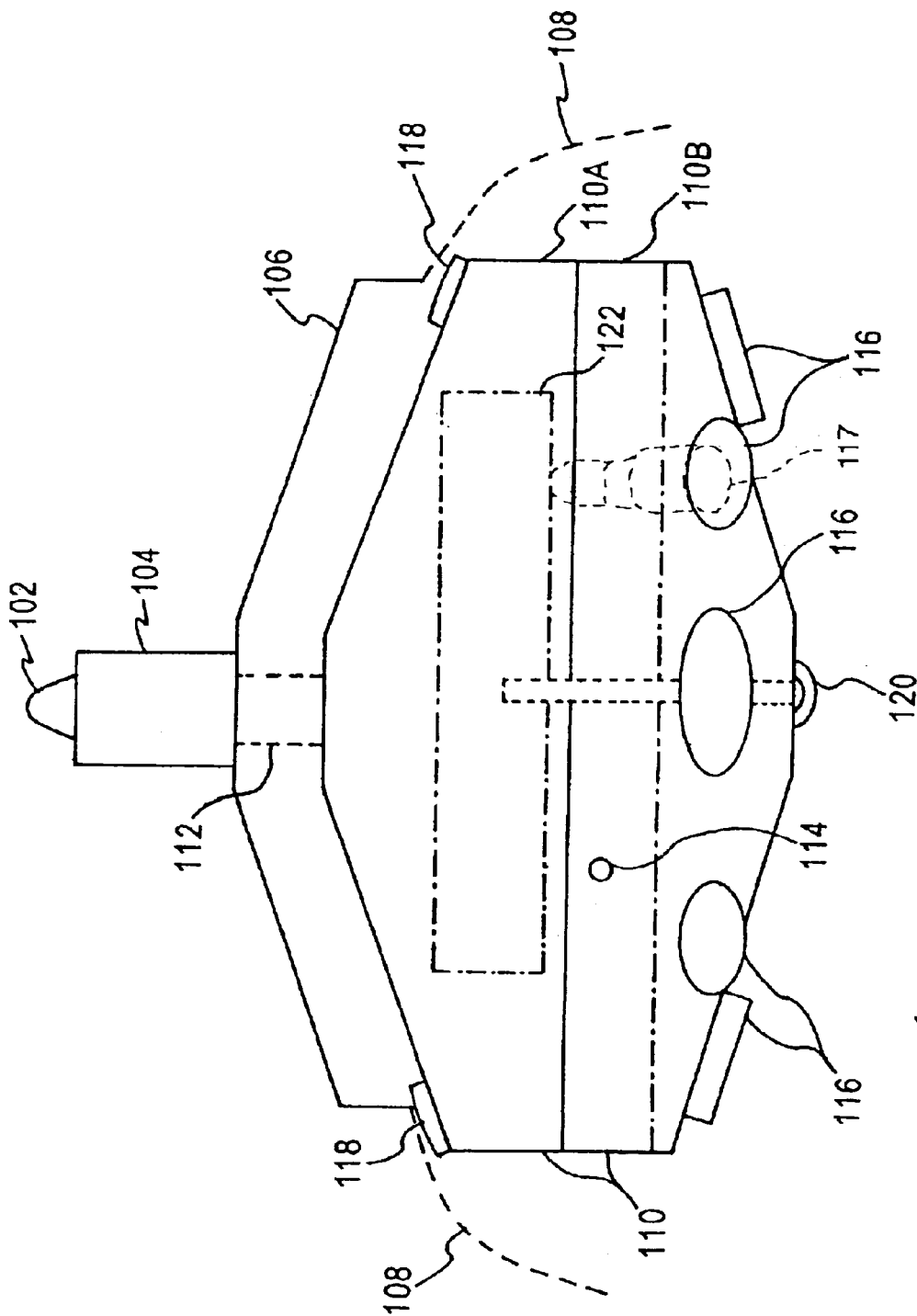
FIG. 1 is a side view of a preferred embodiment of a light fixture of the present invention.

The present invention is directed to a unique light fixture that works without a standard dimmer otherwise used to control the light output level of a normal fixture. The normal fixture has a single filament that is large enough to produce all of the light generated by the filament resistance to the full wattage (voltage times amperage) of the fixture. The present invention may be analogized to dividing the filament into a plurality (e.g., 256) of smaller filaments and feeding each smaller filament with the full voltage. However, advantageously, the resistance per filament will be lower, the corresponding current draw will be less and the wattage to each of the smaller filaments will be approximately $\frac{1}{256}^{th}$ of the total of the entire filament.

By furnishing full voltage to each filament and being able to control the on or off condition of each filament, in accordance with the unique features of this invention, it is possible to produce 256 different levels of illumination or light output level without the use of any device for altering the voltage supplied to the lamp. In fact, in one preferred embodiment as will be seen below, a single power source can feed the switching mechanism inside the fixture to control the on or off condition of each of the filaments. The use of the term "filament" is used to refer to a light source.

The use of the term "light source" refers to a device that produces light and is supplied by a single source of power. A light source can be a single light source within a fixture or multiple light sources within a single fixture. A light source can be any light emitting device, such as compact fluorescent, self ballasted fluorescent, incandescent, mercury, metal halide, low pressure sodium, high pressure sodium bulbs, arc tubes and light emitting diodes.

The present invention is not limited to any particular size or configuration of light sources. The light sources used can be of any size or wattage. In an alternate embodiment, the light source may be a light source manufactured having move than two individually controllable filaments and a light control, as described below. One such light source may have up to 256 filaments. Each filament may be individually turned on and off. The fixture can be used in many different locations and configurations, such as indoor fixtures, outdoor fixtures, direct lighting, indirect lighting, decorative lighting, accent lighting.

The installation of a filament controller or light controller (e.g., the light control described in detail below) inside a fixture is important to the present invention. Communication with the light controller with low voltage telephone cable or no wires, using established forms of communication like line current carrier, radio frequency (RF) signals, infrared signals or any other communication mechanism enables the on-board light controller to receive commands from other light controllers and other signaling devices.

Each fixture is individually addressable within a local area network (LAN). The light controller switching on and off each and every light source (e.g., filament) within the fixture does so by individually addressing each and every light source. This is very different from common prior art practice as described above in detail. Current prior art practice to dim a fixture is to vary the voltage coming from a phase fired SCR dimmer. The voltage is supplied to a single light source and the light output level increases in intensity as the voltage and current increase. There is RFI and EMI generated by the SCR dimmer even with a torroidal choke on the output of the dimmer. In contrast, the present invention generates no additional RFI or EMI due to varying the light output level.

FIG. 1 is a side view diagram of an exemplary light fixture, generally indicated by reference numeral 100, according to a preferred embodiment of the present invention. Fixture 100 includes a mounting hook 102, a power/control junction box 104, a dome 106, a reflector 108 (indicated by dashed lines), and a pod 110. Mounting hook 102 is used to suspend fixture 100 from a standard ceiling mount, as is known in the art, and is connected to power/control junction box 104 to support the fixture assembly. Power/control junction box 104 may be a conventional electrical junction box for completing power and control wiring connections.

Dome 106 is connected to power/control junction box 104 and retains reflector 108 on fixture 100. Reflector 108 is a substantially hemispherically shaped shell of, for example, acrylic, aluminum, or fiberglass and may have a reflective surface oriented to direct the light output of fixture 100 in a substantially downward direction, i.e., toward an area intended for illumination.

Figure 2:
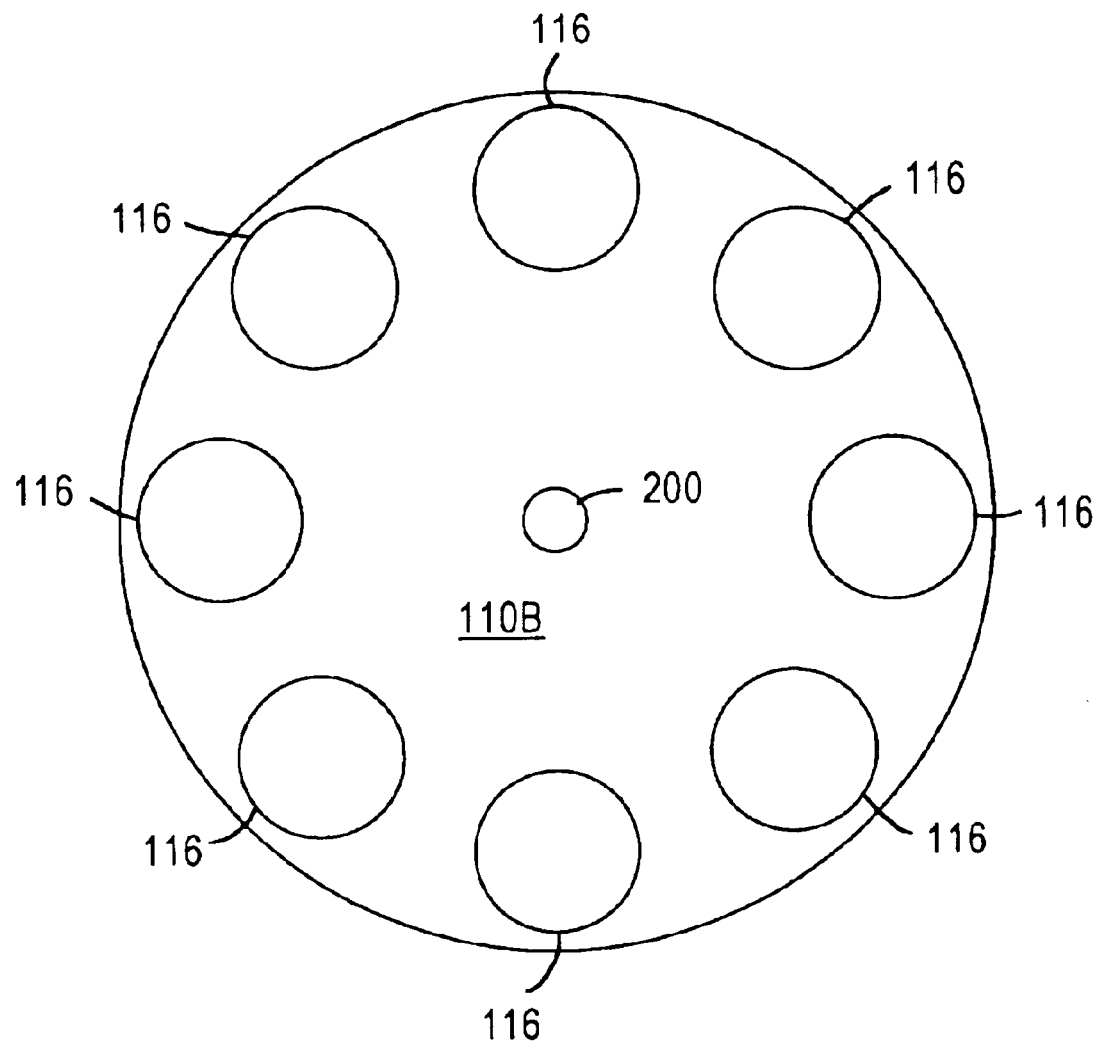
FIG. 2 is a bottom view of the light fixture of FIG. 1.

Pod 110 is connected to dome 106 via a hollow connection pipe 112 (shown in dashed lines) and includes an upper pod half 110A and a lower pod half 110B. Upper pod half 110A is a connected to lower pod half 110B by three circumferentially spaced screws 114 (only one shown). Lower pod half 110B has light source socket holes 116, on a downward facing portion of the pod half. Light source socket holes 116 are diametrically sized to accommodate the base of the intended light source 117 (shown in dashed lines), e.g., a standard light bulb or a compact flourescent light bulb. Different fixtures may have differing diameter light source socket holes 116 depending on the light source to be used. In this particular example, there are eight evenly spaced light source socket holes 116 evenly spaced along a portion of lower pod half 110B. FIG. 2 is a bottom view of lower pod half 110B showing the location of light source socket holes 116 and the location of the hole 200 for mounting a threaded rod 120 to lower pod half 110B. In alternate embodiments, the light source socket holes 116 may be arranged such that the base of light source 117 is below the light producing portion of the light source, i.e., the light source "burns up", as opposed to the above-described configuration in which the light source "burns down." By arranging the light source socket hole 116 and light source 117 so that the light source burns up, there is a reduction in the amount of heat received at the base of light source 117.

Three spacers 118 (only two shown) are evenly spaced at the connection of dome 106, reflector 108, and pod 110 to provide ventilation for the upper half of fixture 100.

Threaded rod 120 is mounted to lower pod half 110B and extends upward inside pod 110 toward upper pod half 110A. The upper end of threaded rod 120 forms a mounting location for light control 122 (shown in dot-dash lines) located inside pod 110. Light control 122 is similar to light control described in detail above.

Figure 3:
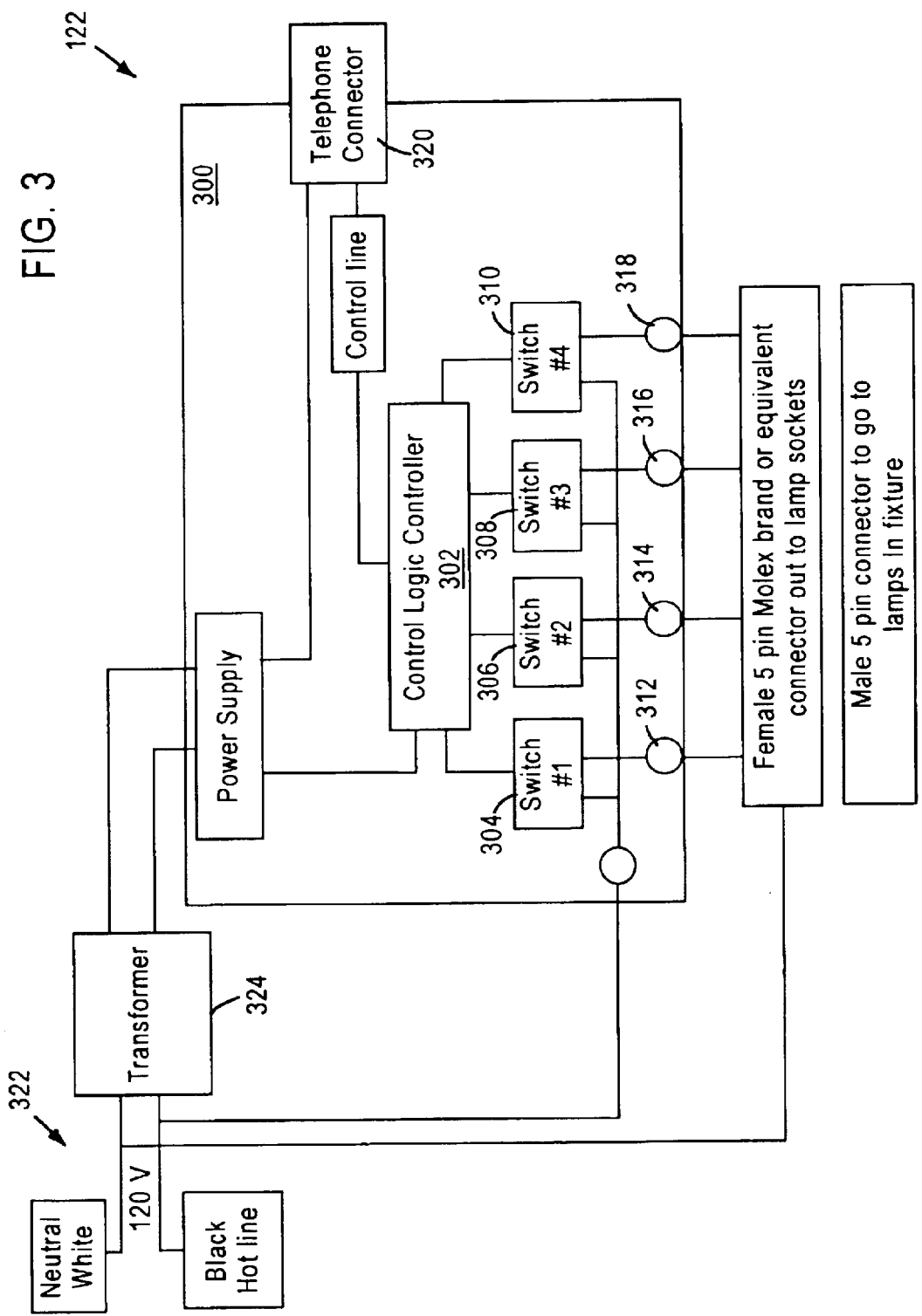
FIG. 3 is a block diagram of a light control of the light fixture of FIG. 1.

Light control 122 is now described in more detail with reference to FIG. 3. FIG. 3 is a block diagram of an example of the light control 122 of the present invention. FIG. 3 is representative only, as many other combinations and permutations may be used to accomplish equivalent functionality.

Light control 122 is responsible for individually controlling, i.e., turning on and off, each of the light sources 117 connected to the fixture 100. Light control 122 is preferably a printed circuit board 300 including a control logic controller 302, four switches 304–310, four terminals 312–318, and a telephone connector 320. In order to simplify the diagram, only a representative four switches 304–310 and terminals 312–318 are shown and described in connection with FIG. 3. The telephone connector 320 provides a mechanism for communication between (a) light controllers in different fixtures, (b) a light controller and a control panel, and (c) a light controller and an accessory control device (described below). The telephone connector 320 may also be a computer networking device for communication with other devices.

The control logic controller 302 sends and receives signals through telephone connector 320 and controls the switches 304–310. The control logic controller 302 may be a single control chip or circuit or it may include a computer system, as described below.

The switches 304–310 in turn provide power to the corresponding terminals 312–318 when the control logic controller 302 turns them on and do not provide power to terminals 312–318 when the control logic controller 302 turns them off. Terminals 312–318 are connection points for the light source sockets 116 of fixture 100.

A power source, generally indicated by reference numeral 322, provides 120 volt alternating current (AC) power to light control 122. A power transformer 324 receives 120 volt power from power source 322 and transforms the voltage to 10 volt direct current (DC) to be provided to light control 122. In an alternate embodiment, power transformer 324 may be made an integral part of light control 122. Control logic controller 302 and telephone connector 320 receive power from power transformer 324.

Figure 4:
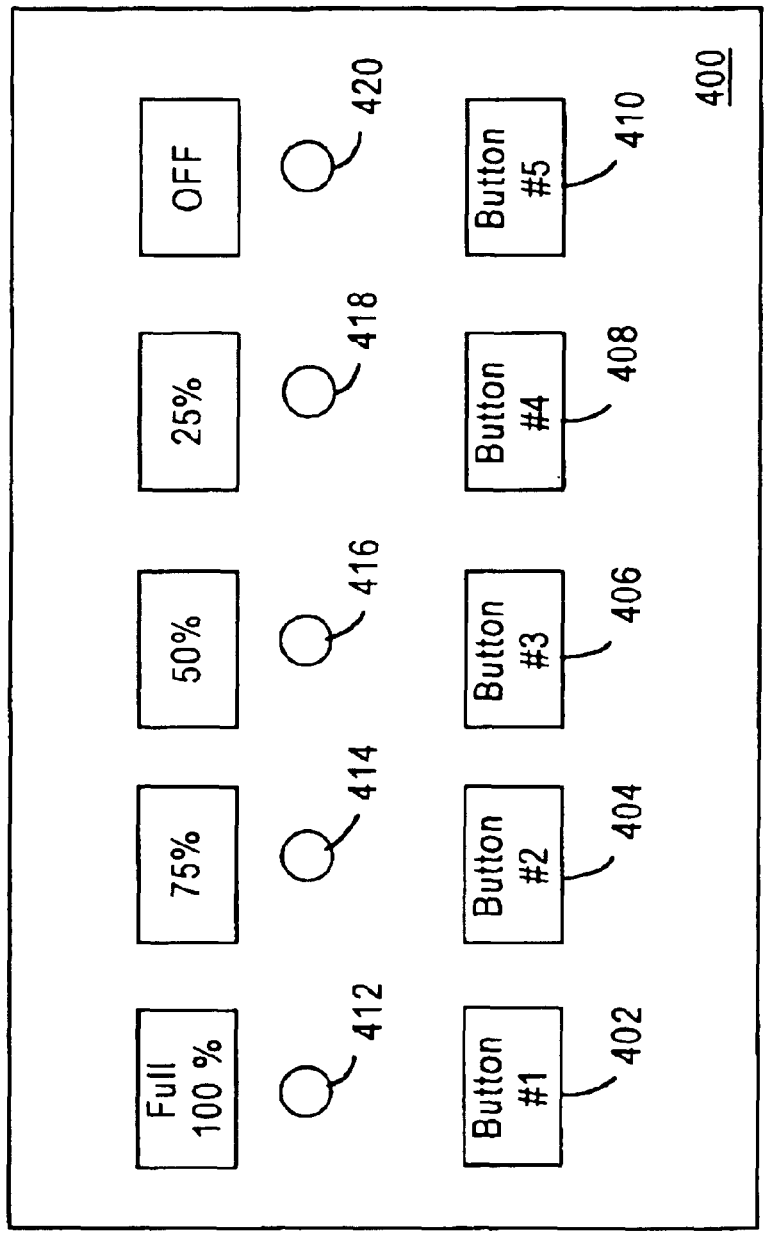
FIG. 4 is a view of an embodiment of a control panel of the present invention.

With a control panel 400, as shown in FIG. 4 and described in detail below, connected to telephone connector 320, light control 122, and in particular, control logic controller 302 is controlled by signals from control panel 400, as described below.

An example is helpful in describing the operation of control panel 400 to control fixture 100. Control panel 400 transmits control signals to fixture 100 to control the light output level of fixture 100. The control signals may be transmitted via a wired (e.g., electrical, optical) or wireless (e.g., radio frequency, infrared) mechanism. In alternate embodiments, fixture 100 is able to transmit status signals indicative of the status of fixture 100 to control panel 400. In the present example, a user pressing control button 402 (FIG. 4) causes a control signal to be sent to fixture 100 commanding the fixture 100 to provide 100% light output. Upon pressing control button 404 (FIG. 4), a control signal is sent to fixture 100 directing fixture 100 to provide 75% light output. When the user presses control button 406 (FIG. 4), a control signal is sent from panel 400 to fixture 100 commanding the fixture 100 to provide 50% light output. Continuing in this manner, the light output of fixture 100 may be incrementally dimmed from a full output state to a full off state.

In another example using voltage levels, control logic controller 302 controls switches 304–310 according to the following table:

TABLE T1

| Control voltage | Switches |
|---|---|
| 0% control voltage | 100% on, 0% off |
| 25% control voltage | 75% on, 25% off |
| 50% control voltage | 50% on, 50% off |
| 75% control voltage | 25% on, 75% off |
| 100% control voltage | 0% on, 100% off |

The control voltage is the voltage level received as input from telephone connector 320 at control logic controller 302. Per Table T1 above and upon detecting a 25% control voltage level or at least 2.5 volts received from telephone connector 320, control logic controller 302 turns 75% of the switches on or six of the eight available light source sockets to provide 75% of the light output of fixture 100. If a user pushes control button 410 of FIG. 4 (corresponding to the off setting for the fixture), 100% of the control voltage level or 10 volts is passed from the control panel 400 to control logic controller 302 via telephone connector 320. Receiving 100% control voltage, control logic controller 302 commands the switches such that all of the eight light source sockets receive no power and no light is output from fixture 100. In alternate embodiments, different percentages may be used as control voltages.

Using the same approach, accessory control devices may be used to control light control 122 and additional light controls may be networked using telephone connector 320 to relay signals received at light control 122. In alternate embodiments, different signaling mechanisms and/or voltage levels may be used without departing from the spirit and scope of the present invention.

Accessory control devices refers to additional devices capable of providing control signals to fixture 100. Examples of accessory control devices include photo sensor, motion sensor, infrared sensor, temperature sensor, and time and date-based control devices. For example, upon detecting motion within its field of view, a motion sensor reduces the output signal control voltage supplied to telephone connector 320 to 0% control voltage signaling the light control 122 of fixture 100 to turn on all (100%) of the switches and corresponding light source sockets increasing the light output level of fixture 100 to maximum brightness or a 100% light output level. Additional accessory control devices can be similarly configured to provide output signals to either a single or networked, multiple light fixtures.

Figure 5:
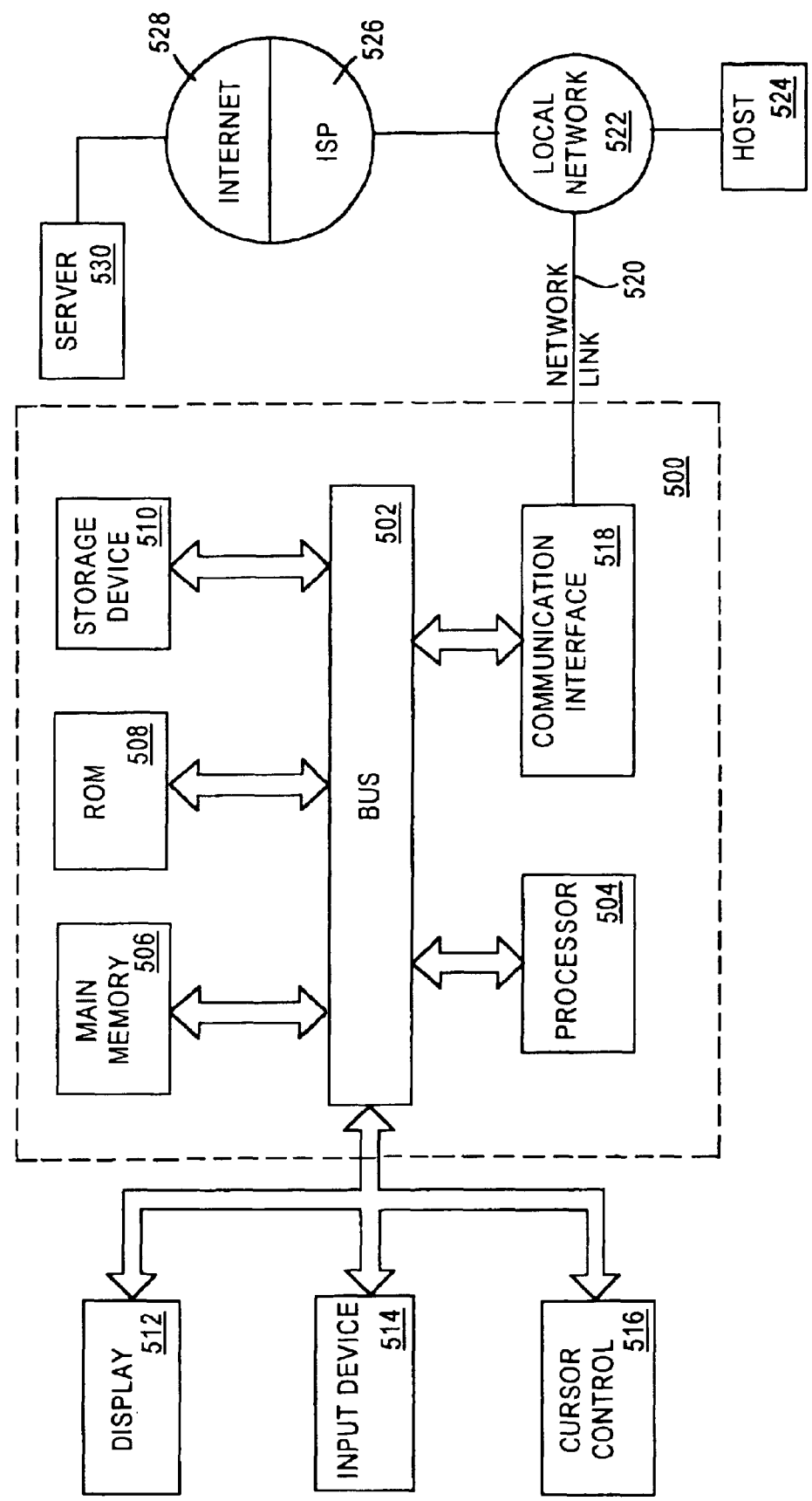
FIG. 5 is a high level block diagram of a computer system.

FIG. 5 is a block diagram illustrating an exemplary computer system 500 upon which an embodiment of the control logic controller of the present invention may be implemented. The present invention is usable with currently available personal computers, mini-mainframes and the like.

Computer system 500 includes a bus 502 or other communication mechanism for communicating information, and a processor 504 coupled with the bus 502 for processing information. Computer system 500 also includes a main memory 506, such as a random access memory (RAM) or other dynamic storage device, coupled to the bus 502 for storing fixture and/or network-related information (such as number of light source sockets, number of networked fixtures, light source light output levels) and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to the bus 502 for storing static information and instructions for the processor 504. A storage device 510, such as a magnetic disk or optical disk, is provided and coupled to the bus 502 for storing information and instructions.

Computer system 500 may be coupled via the bus 502 to a display 512, such as a cathode ray tube (CRT) or a flat panel display, or to control panel 400 of FIG. 4 for displaying information to a user. An input device 514, including alphanumeric and function keys, is coupled to the bus 502 for communicating information and command selections to the processor 504. Another type of user input device is cursor control 516, such as a mouse, a trackball, or cursor direction keys for communicating direction information and command selections to processor 504 and for controlling cursor movement on the display 512. This input device typically has two degrees of freedom in two axes, a first axis (e.g., x) and a second axis (e.g., y) allowing the device to specify positions in a plane.

The invention is related to the use of a computer system 500, such as the illustrated system of FIG. 5, to control the light output level of a fixture or a network of fixtures, such as fixture 100 of FIG. 1. According to one embodiment of the invention, the light output level of fixture 100 is controlled by computer system 500 in response to processor 504 executing sequences of processor instructions contained in main memory 506 and determining that the light output level is to be increased or decreased. Such instructions may be read into main memory 506 from another computer-readable medium, such as storage device 510.

However, the computer-readable medium is not limited to devices such as storage device 510. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 506 causes the processor 504 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 500 also includes a communication interface 518 coupled to the bus 502. Communication interface 508 provides a two-way data communication as is known. For example, communication interface 518 may be an integrated services digital network (ISDN) card, a digital subscriber line (DSL) card, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals which carry digital data streams representing various types of information. Of particular note, the communications through interface 518 may permit transmission or receipt of light output level control signals. For example, two or more computer systems 500 may be networked together in a conventional manner with each using the communication interface 518.

Network link 520 typically provides data communication through one or more networks to other data devices. In alternate embodiments, telephone connector 320 of FIG. 3 may be network link 520. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals which carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for adjusting the light output level of a fixture or a network of fixtures. Additionally, the light output level for a particular fixture 100 may be modified by a host 524 or server 530 using network link 520.

The received code may be executed by processor 504 as it is received, and/or stored in storage device 510, or other non-volatile storage for later execution. In this manner, computer system 500 may obtain application code in the form of a carrier wave.

In one embodiment, the light fixture has 256 different light sources. Each light source is small, approximately 2 to 10 Watts, and burns at full brilliance when full power is applied. Current investigations have concluded that the human eye cannot discern an increase or decrease of less than $1/256^{th}$ of light output level. Some of the finest digital theatrical dimmers have 256 steps or increments of control.

Another embodiment of the present invention has a light control including a computer controlled switching array that controls up to 256 switches turning on and off the voltage supplied to the individual light sources. The light output from the fixture will vary from off to fill bright in a smooth and even graduation. There is no EMI or RFI due to varying the light output level and there is no need for sign wave voltage chopping or filtering. All switching can be done at zero crossing to the resulting inrush current is limited to $1/256^{th}$ of the total light source that is being turned on at the time.

Figure 6:
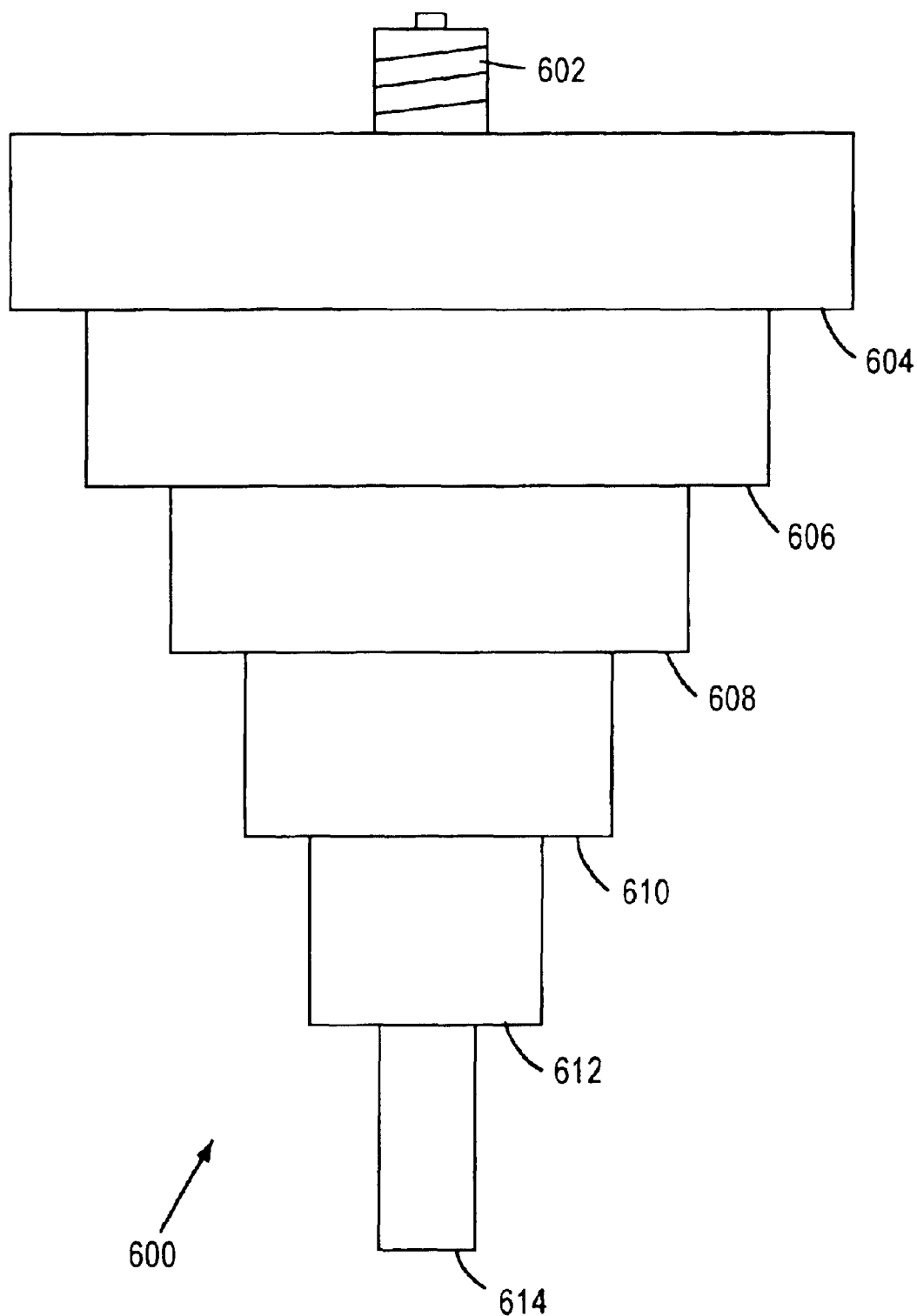
FIG. 6 is a side view of another embodiment of a light fixture of the present invention.

An example embodiment of a single screw-in fixture is shown in FIG. 6. FIG. 6 is a side view diagram of an embodiment of the present invention, wherein the light fixture is generally indicated by reference numeral 600. The fixture 600 includes a base 602 for connecting to a standard power source, as is known in the art, and is a cone shaped reflector for placement inside a reflector to produce totally variable light intensities. The light controller (not shown) is located inside fixture 600 and receives signals via a network connection, as described above. Proceeding down the page away from base 602 are light source rings 604–614 providing successively smaller radius circumferential locations on which light sources (not shown) are mounted. Light sources are mounted on the bottom of each of light source rings 604–614 such that the light output radiates evenly from fixture 600.

Figure 7:
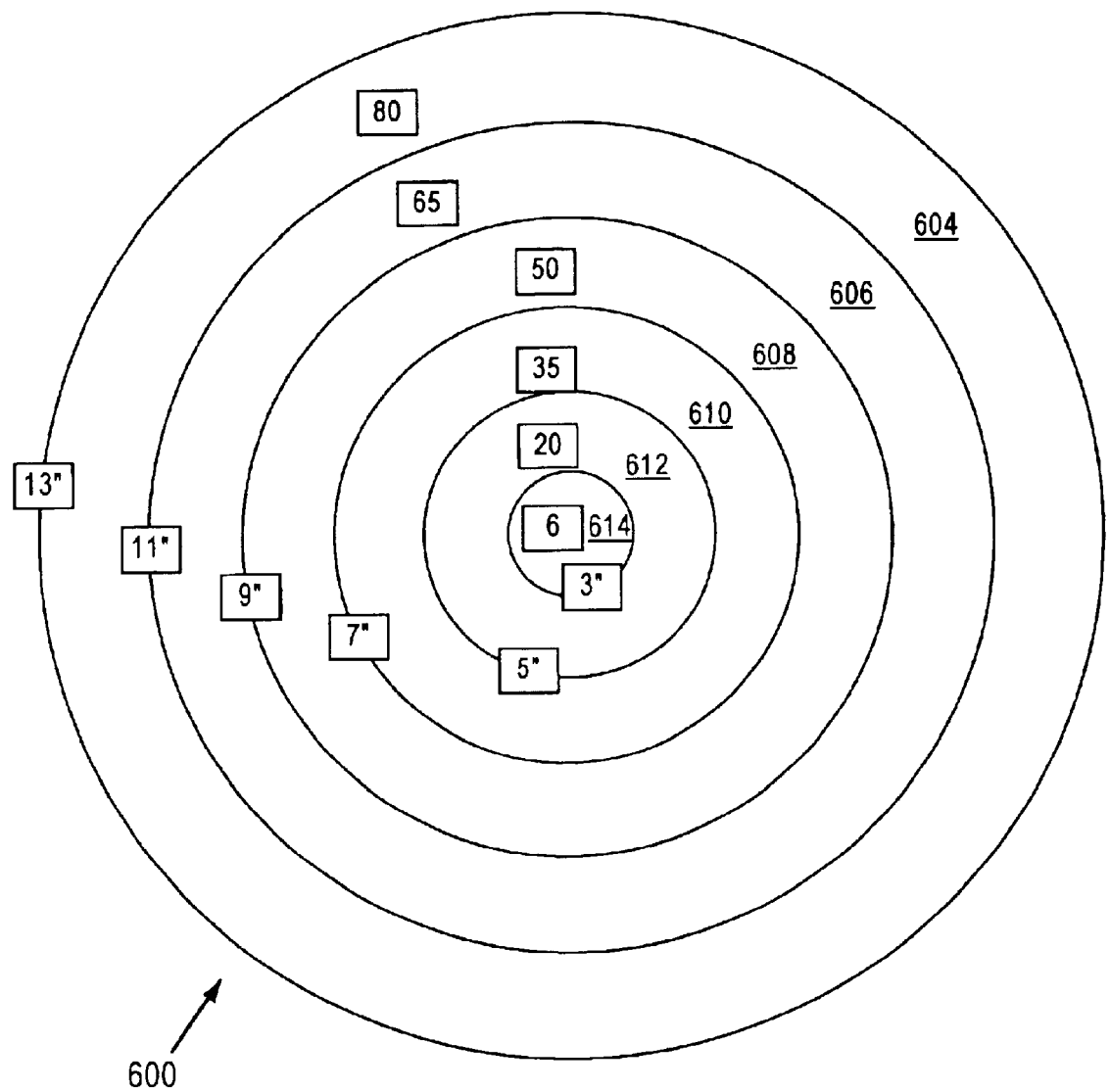
FIG. 7 is a bottom view of the light fixture of FIG. 6.

FIG. 7 is a bottom view of fixture 600 of FIG. 6. A uniform distribution of 256 light sources results in the following distribution of light sources per light source ring 604–614:

|  |  |
|---|---|
| ring 604 | 80 light sources |
| ring 606 | 65 light sources |
| ring 608 | 50 light sources |
| ring 610 | 35 light sources |
| ring 612 | 20 light sources |
| ring 614 | 6 light sources |

It is to be understood that different numbers and distributions of light sources and light source rings are possible and the present numbers are provided for illustrative purposes only.

In a further example as depicted in FIG. 4, a control panel 400 is provided for communication with fixture 600. Control panel 400 may be connected via direct connection or through a networking mechanism of fixture 600 in order to send and/or receive signals with fixture 600. Control panel 400 includes control buttons 402–410 and corresponding LEDs 412–420. Control buttons 402–410 are used to command fixture 600 to a predetermined light output level of 100%, 75%, 50%, 25%, and 0% or off, respectively. LEDs 412–420 are illuminated to indicate the current commanded setting of the light output level of fixture 600. For example, a user pressing control button 404 causes control panel 400 to send a signal to fixture 600 to set the light output level of the fixture to 75% of the maximum light output level. When the user presses control button 404, the corresponding LED, in this example 414, is illuminated indicating the user has commanded a light output level of 75%.

In alternative embodiments, the control buttons 402–410 may be dedicated push buttons, a rotary controller, a linear slider, touch pad, or another type of control including liquid crystal display, computer touch screen, or other computer diagram display for setting the intensity of the lamp. As stated above, the signal may also be sent using the network capability of fixture 600.

The ability to vary the color of the light output by the fixture can be controlled if the fixture is equipped with colored glass over the individual light sources or using primary colored light sources. By mixing the colors in different amounts, it is possible to produce any color of the rainbow. Increasing the number of colored light sources in the same ratio, it is possible to maintain the exact same color and increase the intensity or saturation of the colored light output by the fixture. This feature is very useful in theatrical or display lighting where change of color is used to produce eye catching attractions necessary for an effective display.

Figure 8:
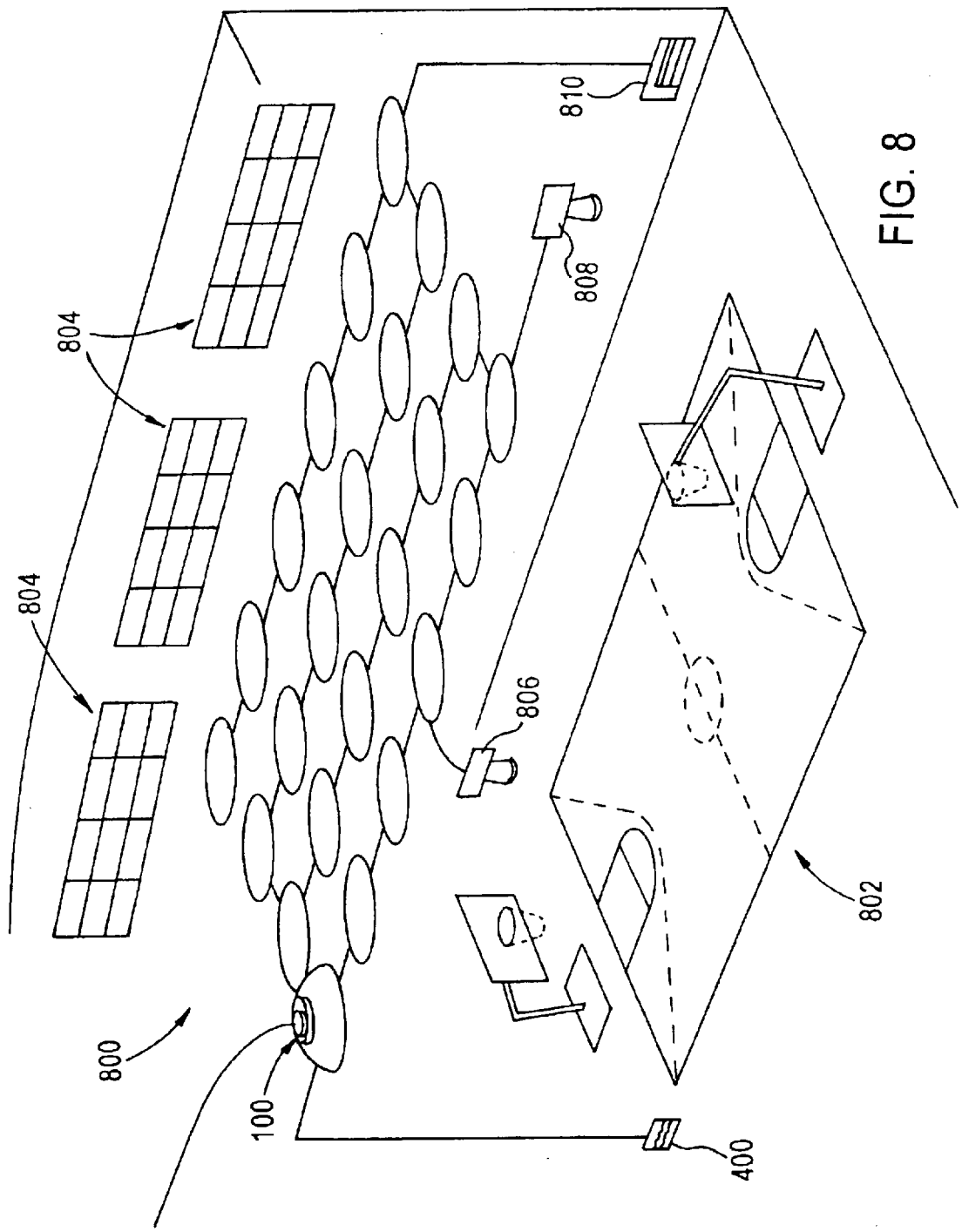
FIG. 8 is a perspective view of a network of the light fixture of FIG. 1 for use in a gymnasium.

In another example, multiple fixtures, generally indicated by reference numeral 800, are networked and controlled to provide variable light output to an indoor basketball court 802 as shown in FIG. 8. The indoor gymnasium is depicted having a basketball court 802 and windows 804. 24 networked light fixtures similar to fixture 100 described in detail above are suspended over the basketball court 802 using mounting hook 102. The networked fixtures 800 are on a large portion of the day, but there is much of the time that the light output is wasted since the room is empty or the sunlight from windows 804 is bright enough that the light from networked fixtures 800 is not needed.

Each individual light fixture 100 has eight light sources wired on eight circuits inside the junction box 104 at the top of each fixture 100. As indicated by FIG. 1, there is a light control 122 inside each fixture 100 and a telephone cable connects all 24 fixtures together in a daisy chain. The telephone cable daisy chain includes three accessory control devices including (1) a motion sensor 806 for detecting motion in the gymnasium, (2) a daylight sensor 808 for measuring the light level in the gymnasium, (3) a time clock control 810 for providing time of day control, and a control panel 400 for manually controlling the light output level of the networked fixtures 800.

Each fixture in the network 800 individually receives 120 volts AC power. The light control 122 inside each fixture 100 has a 10 volt transformer, a control logic controller, and eight solid state power switches capable of handling 1 amp at 120 volts AC. The transformer supplies 10 volts out one wire of the telephone cable and another wire of the telephone cable returns the control voltage provided to the control logic controller of the light control. As described above, the logic of the control logic controller is set up so that if the incoming control line has no voltage, then all eight of the switches are on and all eight light sources of the fixture output light. Thus, there is a fail-safe condition that if power fails and comes back on, the light output level goes to full bright or maximum output.

Using the logic described in relation to Table T1 above, the control logic controller of each fixture controls the switches and corresponding light sources and sockets of its fixture. When the control voltage level is 0 volts, all of the switches are on and the light output level of the fixture is maximum. If the control voltage level is above 2.5 volts, 2 of the switches are off producing a light output level 75% of the maximum light output level. If the control voltage level is above 5.0 volts, 4 of the switches are off and the light output level is 50% of maximum. When the control voltage level is above 7.5 volts, 6 of the switches are off and the light output level is 25% of maximum. If the control voltage level is 10.0 volts, then all the switches are off and the light sources are off producing no light output.

The control panel 400 receives the 10 volts input and reduces the voltage returned based on the status of the control buttons 402–410. When the first push button 402 is activated, no voltage is returned to the network 800 and all lights at all fixtures will be at maximum light output level. If the second push button 404 is activated by a user, 2.5 volts are returned and two lights in each fixture 100 will be turned off, as described above. When the third push button 406 is activated, 5.0 volts are returned to the network 800 and four lights in each fixture 100 will be turned off. If the fourth button 408 is activated, 7.5 volts will be returned and six lights in each fixture 100 will be turned off. When the fifth button 410 is activated by a user, the full 10.0 volts are returned to the network 800 and all of the lights are turned off.

There may be several different types of control panel 400 depending on the location, the network configuration, and the sophistication of the user, e.g., push buttons with momentary pilot lights and slider switches with status display. There may be more than one control panel connected to a network. As control panels are added to the network, the last control panel used by a user determines the operation of the fixture. In an alternate embodiment, the control panel returning the highest voltage will override the other control panel settings and the control logic controller of each fixture will operate according to the command of the station calling for the least amount of light.

The additional accessory control devices 806–810 are connected to the network 800 and provide additional signals to control the network 800. The motion sensor 806 is connected to the network 800 and returns 10.0 volts when the sensor indicates that nothing is moving in the gymnasium. If motion is detected in the gymnasium, no voltage is returned to the network 800 and all fixtures provide the maximum light output level.

The photo sensor 808 is connected to the network 800 and has a photo resistor element and a trim potentiometer for setting the sensitivity of the photo sensor 808. The trim potentiometer is set for the maximum light and as the light increases above the maximum setting, photo sensor 808 returns 10 volts to network 800. A capacitor arrangement is used to decrease the speed of the light output change commanded and compensate for clouds passing by windows 804 or basketballs passing in front of the photo sensor 808. As the voltage increases through the four previously described thresholds, the control logic controller in the fixtures of the network turns off the appropriate number of switches, light source sockets and light sources.

The time clock control 810 is connected to the network 800 and enables the fixtures to be used during time periods set by a building manager. For example, if the gymnasium is not open from midnight until 6 a.m., the time clock is set to disable the network 800 by providing 10 volts control voltage to the network 800. The time clock control 810 could also be used as a security function to prevent vandals from turning on lights in order to vandalize a location.

Alternatively, the transformer does not supply 10 volts out the telephone cable and control signals are used in place of control voltages to control the control logic controller in the example described above. In this example, the fixture 100 defaults to full on (i.e., full light output level) at the time power is provided to the fixture 100.

Using the control signal logic described above, the control logic controller of each fixture controls the switches and corresponding light sources and sockets of its fixture. When a control signal commands 100% light output, all of the switches are on and the light output level of the fixture is maximum. If the control signal directs 75% light output, two of the switches are off producing a light output level 75% of the maximum light output level. If the control signal commands 50% light output, four of the switches are off and the light output level is 50% maximum or half the total light output of the fixture. When the control signal directs 25% light output, six of the switches are off and the light output level is 25% of maximum. If the control signal commands the lights off, then all the switches are off and the light sockets and light sources are off producing no light output.

In this embodiment, as the user pushes the control buttons 402–410 on control panel 400, appropriate control signals are provided to control logic controller. For example, when the first push button 402 is activated, a signal is provided to network 800 and all lights at all fixtures will be at maximum light output level. If the second push button 404 is activated by a user, a control signal is provided to network 800 and two lights in each fixture 100 will be turned off, as described above, and similarly for the third, fourth, and fifth buttons 406–410, respectively. As described above, the last control panel used by a user determines the operation of the fixtures.

The additional accessory control devices 806–810 are connected and operate as described above; however, instead of supplying a voltage level to the network 800 the devices 806–810 provide appropriate control signals to control the fixtures.

There are many advantages of the present invention that may be realized, both jointly and severally, through practice of one or more embodiments disclosed herein:

The fixture can use different wattage light sources without requiring a change of remote ballasts.

The fixture can use light sources with integral ballasts for replacement from below, without requiring disconnection of the fixture from the power source.

Each fixture in a networked set of fixtures is able to have its own unique address and each light source or light source socket in a fixture is able to have its own unique address.

The amount of illumination from the fixture can be controlled using low voltage wires or wireless mechanisms.

The lighting distribution of the fixture is uniform all the time when any of the light source sockets are powered. The addition or subtraction of additional light sources does not affect the distribution curve of the fixture light output.

Only one power source for the entire fixture is required, no matter how many lighting levels are provided.

Power consumption to the fixture is internally limited so that higher wattage light sources than the fixture was designed for cannot be used. The fixture can be automatically, totally disabled on such an occurrence requiring a factory authorized technician to repair the fixture. This feature insures that there will not be a case of overcurrent or overheating with the fixture.

A unique feature of the present invention is integrated, distributed light control of the light sources, light source sockets, and fixtures. In the present invention, the integrated distributed light control does not require relays, switches or other electromechanical devices or dedicated power or control wiring.

The fixture can use motion sensors, occupancy sensors, photo sensors, time clocks, energy management systems, load shedding controllers, and other control devices to individually control light source sockets, light sources, and fixtures.

The fixture can be easily renewed and maintained by replacing the light source.

The fixture is a viable solution to many lighting and energy control problems in various types of buildings. The fixture is well suited to applications requiring visual acuity. Because of the high color temperatures possible with the light sources and the light source distribution within a fixture, the vertical foot-candles from the fixture are much higher than with a single light source fixture.

An obvious benefit of the fixture is the energy savings available from the multiple light levels possible. The use of switching or control products allows users to customize the operation of the fixture.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What I claim is:

1. A self-contained computerized variable intensity light controller, comprising:

at least two connectors adapted to provide power to at least two fluorescent light sources;

a power source connector for connecting the light controller to a power source; and a computerized light control connected to, and integrated with, said power source connector for receiving power and connected to said connectors for providing power to said at least two connectors without using a filter, a phase-fired SCR, a choke and an amplifier, wherein:

said controller is networkable;

said light control is adapted to send and receive signals; and said sent signals comprise commands to control another computerized light control.

2. A self-contained computerized variable intensity light controller, comprising:

at least two connectors adapted to provide power to at least two fluorescent light sources;

a power source connector for connecting the light controller to a power source; and a computerized light control connected to, and integrated with, said power source connector for receiving power and connected to said connectors for providing power to said at least two connectors, wherein:

said controller is networkable;

said light control is adapted to send and receive signals; and said sent signals comprise commands to control another computerized light control.

* * * * *